United States Patent
Nainar et al.

(10) Patent No.: US 11,792,065 B2
(45) Date of Patent: Oct. 17, 2023

(54) NETWORK CONTROLLER, FAILURE INJECTION COMMUNICATION PROTOCOL, AND FAILURE INJECTION MODULE FOR PRODUCTION NETWORK ENVIRONMENT

(71) Applicant: Cisco Technology, Inc., San Jose, CA (US)

(72) Inventors: Nagendra Kumar Nainar, Morrisville, NC (US); Jaganbabu Rajamanickam, Kanata (CA); David John Zacks, Vancouver (CA); Carlos M. Pignataro, Cary, NC (US); Madhan Sankaranarayanan, Chinnamanur (IN); Cesar Obediente, Apex, NC (US); Craig Thomas Hill, Sterling, VA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/674,686

(22) Filed: Feb. 17, 2022

(65) Prior Publication Data
US 2023/0261928 A1    Aug. 17, 2023

(51) Int. Cl.
*H04L 41/0604*    (2022.01)
*H04L 41/0654*    (2022.01)
(Continued)

(52) U.S. Cl.
CPC ...... *H04L 41/0627* (2013.01); *H04L 41/0631* (2013.01); *H04L 41/0654* (2013.01);
(Continued)

(58) Field of Classification Search
CPC ............ H04L 41/0627; H04L 41/0631; H04L 41/0654; H04L 61/103; H04L 63/101; H04L 67/133
(Continued)

(56) References Cited

U.S. PATENT DOCUMENTS 8,086,909 B1 * 12/2011 Liu ..................... G06F 11/0778
                                                    714/39
8,248,958 B1    8/2012 Tulasi et al.
(Continued)

OTHER PUBLICATIONS

Chang et al, "Chaos Monkey: Increasing SDN Reliability Through Systematic Network Destruction", Sigcomm, published Aug. 17, 2015, 2 Pages.
(Continued)

*Primary Examiner* — David P Zarka
(74) *Attorney, Agent, or Firm* — Lee & Hayes, P.C.

(57) ABSTRACT

Methods and devices provide fault injection testing techniques in a production network environment without risking service outages for hosted computing services, by providing examples of a remote network controller configured to communicate with network devices of a network; a remote fault injection communication protocol configuring a remote network controller in communication with a network device to signal a failure injection; and a failure injection module configuring a network device to configure a network device processor to implement a failure injection signaled according to the remote failure injection communication protocol. The method includes a network controller transmitting a failure injection signal in a control plane packet over a network connection to a network device, and the network device creating a child process by executing, in a dedicated runtime environment, a copy of one or more processes impacted by a parsed failure type.

10 Claims, 6 Drawing Sheets

(51) Int. Cl.
  *H04L 9/40* (2022.01)
  *H04L 61/103* (2022.01)
  *H04L 41/0631* (2022.01)
  *H04L 67/133* (2022.01)

(52) U.S. Cl.
  CPC .......... *H04L 61/103* (2013.01); *H04L 63/101* (2013.01); *H04L 67/133* (2022.05)

(58) Field of Classification Search
  USPC .......................................................... 709/224
  See application file for complete search history.

(56) References Cited

U.S. PATENT DOCUMENTS

| | | | |
|---|---|---|---|
| 8,683,400 B1* | 3/2014 | O'Riordan | G06F 30/33 716/136 |
| 2003/0154236 A1* | 8/2003 | Dar | H04L 67/1025 709/201 |
| 2006/0206873 A1* | 9/2006 | Argade | G06F 11/3664 717/135 |
| 2006/0235968 A1* | 10/2006 | Murray | H04L 41/0803 709/224 |
| 2007/0050686 A1* | 3/2007 | Keeton | G06F 11/261 714/48 |
| 2008/0209068 A1* | 8/2008 | Herzog | H04L 61/2553 709/232 |
| 2008/0295114 A1* | 11/2008 | Argade | G06F 11/3664 719/320 |
| 2012/0278194 A1* | 11/2012 | Dewan | G06F 11/0784 705/347 |
| 2013/0103739 A1* | 4/2013 | Salgueiro | H04L 41/22 709/203 |
| 2013/0305199 A1* | 11/2013 | He | H03K 19/00369 716/104 |
| 2014/0281715 A1* | 9/2014 | Khan | G06F 11/261 714/28 |
| 2014/0337674 A1 | 11/2014 | Ivancic et al. | |
| 2015/0213568 A1* | 7/2015 | Follis | G06Q 50/18 705/311 |
| 2015/0332043 A1* | 11/2015 | Russello | G06F 11/3466 726/22 |
| 2017/0242784 A1 | 8/2017 | Heorhiadi et al. | |
| 2017/0264577 A1* | 9/2017 | Ganin | H04L 51/23 |
| 2018/0191579 A1 | 7/2018 | Gururao et al. | |
| 2018/0234348 A1* | 8/2018 | Goloubew | H04L 41/147 |
| 2018/0239668 A1* | 8/2018 | Shu | G06F 11/0751 |
| 2019/0044789 A1 | 2/2019 | Dickens et al. | |
| 2019/0325133 A1* | 10/2019 | Goodridge | G06F 21/554 |
| 2019/0333245 A1* | 10/2019 | Zhao | G06K 9/6262 |
| 2019/0354454 A1* | 11/2019 | Shmouely | G06F 11/261 |
| 2019/0372751 A1* | 12/2019 | Yanamadala | H04L 9/004 |
| 2020/0081752 A1* | 3/2020 | Thexton | G06F 9/45512 |
| 2020/0082442 A1* | 3/2020 | Sotomayor | G06Q 30/0255 |
| 2020/0175157 A1* | 6/2020 | Wilding | G06F 11/3664 |
| 2020/0301721 A1* | 9/2020 | Porter | G06F 9/44578 |
| 2021/0334383 A1* | 10/2021 | Wang | G06F 9/4401 |
| 2022/0263571 A1* | 8/2022 | Xie | H04B 10/032 |

OTHER PUBLICATIONS

Bertolino, et al, "A Survey of Field-based Testing Techniques", ACM Computing Surveys, vol. 54, No. 5, Article 92, May 2021, pp. 1-39.

Dai, et al, "Configuration Fuzzing for Software Vulnerability Detection", 2010 International Conference on Availability, Reliability, and Security, IEEE The Computer Society, Columbia University, pp. 525-530.

PCT Search Report & Written Opinion for Application No. PCT/US23/13336, dated May 15, 2023, 14 pgs.

\* cited by examiner

NETWORK CONTROLLER, FAILURE INJECTION COMMUNICATION PROTOCOL, AND FAILURE INJECTION MODULE FOR PRODUCTION NETWORK ENVIRONMENT

TECHNICAL FIELD

This disclosure relates generally to fault injection testing techniques in a production network environment.

BACKGROUND

Network administrators are interested in testing behavior of computing hosts and network devices of a network in response to suffering failures, and make observations of the behavior to devise changes or upgrades to network configuration which are likely to avert such failures after computing services are deployed on the network, to minimize chances of computing services relied upon by end users from failing in such a production network environment. In accordance with the software development discipline of fault injection, a variety of techniques exist for injecting such faults into live production systems.

However, during uptime of a production network environment, and uptime of computing hosts of the production network environment, end users will be running various services, applications, databases, and the like hosted at the production network environment, and it is not desirable to disrupt the running of these services, applications, databases, and the like. It would be unreasonable to require end users to regularly terminate processes or regularly reboot network devices for the purpose of testing the network itself. Thus, it is not always desirable to inject failures into a configuration, routing tables, operating system, or other component of one or more network devices of the production network environment.

As a compromise, network administrators can also perform fault injection testing in a replicate network environment configured on network devices in a controlled setting, rather than a production network environment. Such a compromise avoids incurring live service outages resulting from the injected faults, but, in return, yields fewer assurances that test results will be applicable to a live production network environment.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The devices depicted in the accompanying figures are not to scale and components within the figures may be depicted not to scale with each other.

DESCRIPTION OF EXAMPLE EMBODIMENTS

Overview

Figure 1:
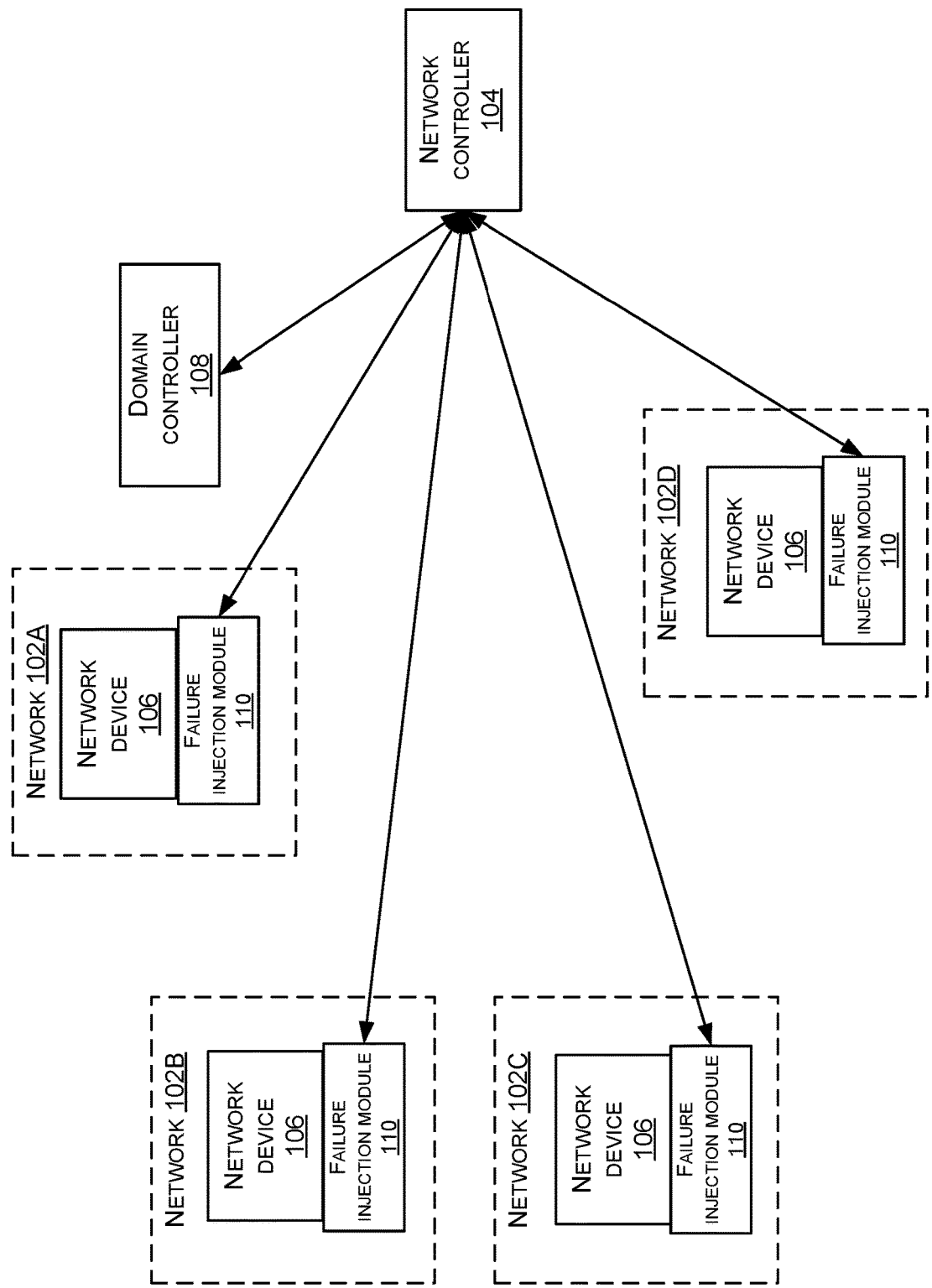
FIG. 1 illustrates a diagram of a remote network controller in communication with network devices of one or more networks, according to example embodiments of the present disclosure.

This disclosure describes fault injection testing techniques in a production network environment, by providing a remote network controller; a remote failure injection communication protocol; and a failure injection module.

Example embodiments of the present disclosure provide fault injection testing techniques in a production network environment without risking service outages for hosted computing services, by providing examples of a remote network controller configured to communicate with network devices of a network; a remote fault injection communication protocol configuring a remote network controller in communication with a network device to signal a failure injection; and a failure injection module configuring a network device to configure a network device processor to implement a failure injection signaled according to the remote failure injection communication protocol.

The described techniques may be implemented in one or more network devices having one or more processing units configured to execute computer-executable instructions, which may be implemented by, for example, one or more application specific integrated circuits ("ASICs"). The processing units may be configured by one or more non-transitory computer-readable media storing computer-executable instructions that, when executed by the processing units cause the processing units to perform the steps.

The method includes a network controller transmitting a failure injection signal in a control plane packet over a network connection to a network device. The method further includes the network device parsing a failure type from the control plane packet. The method further includes the network device creating a child process by executing, in a dedicated runtime environment, a copy of one or more processes impacted by a parsed failure type. The method further includes one of the network controller or the network device injecting a failure into the child process. The method further includes the network device tracing events at the child process running on the network device. The method further includes the network device terminating the child process.

Additionally, the techniques described herein may be performed by a device having non-transitory computer-readable media storing computer-executable instructions that, when executed by one or more processors, performs the method described above.

EXAMPLE EMBODIMENTS

According to example embodiments of the present disclosure, a network is configured by a network administrator over an infrastructure including network hosts and network devices in communication according to one or more network protocols. Outside the network, any number of end devices, external devices, and the like may connect to any host of the network in accordance with a network protocol. One or more networks according to example embodiments of the present disclosure may include wired and wireless local area networks ("LANs") and such networks supported by IEEE 802

LAN standards. Network protocols according to example embodiments of the present disclosure may include any protocol suitable for delivering data packets through one or more networks, such as, for example, packet-based and/or datagram-based protocols such as Internet Protocol ("IP"), Transmission Control Protocol ("TCP"), User Datagram Protocol ("UDP"), other types of protocols, and/or combinations thereof.

It should be understood that end devices can include computing devices and systems operated by end users, organizational personnel, and other users, which connect to a campus network as described subsequently. End devices can also include external devices such as rack servers, load balancers, and the like, which connect to a data center as described subsequently.

The network may be configured to host various computing infrastructures; computing resources; software applications; databases; computing platforms for deploying software applications, databases, and the like; application programming interface ("API") backends; virtual machines; and any other such computing service accessible by customers accessing the network from one or more end devices, external devices, and the like. Networks configured to host one or more of the above computing services may be characterized as private cloud services, such as data centers; public cloud services; and the like. Such networks may include physical hosts and/or virtual hosts, and such hosts may be located in a fashion collocated at premises of one or multiple organizations, distributed over disparate geographical locations, or a combination thereof.

A network administrator may control access to the network by configuring a network domain encompassing computing hosts of the network and network devices of the network. A network administrator may further configure a computing host as a domain controller, the domain controller being configured to handle authentication requests from end devices by an authentication protocol, so that users who successfully authenticate over their end devices can establish a network connection to the network domain.

Computing hosts of the network may be servers which provide computing resources for hosted frontends, backends, middleware, databases, applications, interfaces, web services, and the like. These computing resources may include, for example, computer-executable applications, databases, platforms, services, virtual machines, and the like. While any of these hosted elements are deployed and running over the network, one or more respective computing host(s) where the element is hosted may be described as undergoing uptime. While these hosted elements are not running and/or not available, the network and one or more respective computing host(s) where the element is hosted may be described as undergoing downtime.

Regardless of which computing services are hosted at a network, a network administrator desires to maximize uptime for all elements hosted at the network, so as to maximize availability of those hosted services. At the same time, a configuration of a network, which controls the behavior of network devices underlying the hosted computing services, can fail at many possible points at any arbitrary time, such failure points increasing in number with an increase in complexity of network configuration. Failures in network configuration can, in turn, cause failures of one or more hosted computing services, or failures of the network as a whole.

Network devices are configured to deliver data packets through one or more networks, such as personal area networks ("PANs"), wired and wireless local area networks ("LANs"), wired and wireless wide area networks ("WANs"), the Internet, and so forth. A network device, such as a router, switch, or firewall, can receive, over one or more network interfaces, packets forwarded over one or more networks from other hosts; determine a next hop, route, and/or destination to forward the packets to; and forward the packets, over one or more network interfaces, to a host determined by the next hop, route, and/or destination. The next hop, route, and/or destination in the one or more networks may be determined by any or any combination of static routing tables and various dynamic routing algorithms.

For the purpose of understanding example embodiments of the present disclosure, it should be understood that network devices can fail at a variety of points, such as by damage to a physical component; by a power failure; by an error in software configuration, such as by erroneously closing a network interface; by an error in routing, such as erroneously modifying a cost in a routing table or erroneously adding or removing a route in a routing table; by performance degradation, such as due to excess consumption of computing resources; and the like. Some of these failures, arising from failures of physical components, may be characterized as "hard failures," while others, arising from configuration errors or failures by a network device to correctly run computer-executable instructions, may be characterized as "soft failures."

In accordance with the software development discipline of fault injection, a variety of techniques for injecting soft failures exist. However, performing such tests on production network environments inevitably requires teams of on-duty engineers monitoring the production network environment in real-time to promptly address any service outages that may result from such failures.

As a compromise, network administrators can perform fault injection testing in a replicate physical network environment configured on physical network devices in a controlled setting, rather than a production network environment; however, it is beyond the means of most network administrators to acquire and maintain sets of network devices solely for such controlled testing purposes. Alternatively, network administrators can also perform fault injection testing in a replicate virtual network environment, and, for example, CISCO SYSTEMS INC. of San Jose, Calif. provides virtual machines or virtual platforms simulating physical network devices. In both cases, regardless, there is no guarantee that test results will be applicable to a live production network environment to any quantifiable degree.

Therefore, example embodiments of the present disclosure provide fault injection testing techniques in a production network environment without subjecting hosted computing services to service outages, by providing examples of a remote network controller configured to communicate with network devices of a network; a remote failure injection communication protocol configuring a remote network controller in communication with a network device to signal a failure injection; and a failure injection module configuring a network device to configure a network device processor to implement a failure injection signaled according to the remote failure injection communication protocol.

FIG. 1 illustrates a diagram of a remote network controller in communication with network devices of one or more networks, according to example embodiments of the present disclosure. FIG. 1 illustrates multiple networks 102A, 102B, 102C, and 102D, which can each be configured in various fashions as described above, as private cloud services, such as data centers, public cloud services, and the like; including physical hosts and/or virtual hosts; and with those hosts being located in a fashion collocated at premises of one or multiple organizations, distributed over disparate geographical locations, or a combination thereof.

FIG. 1 further illustrates a network controller 104 in communication with network devices 106 of each of the multiple networks 102A, 102B, 102C, and 102D. The network controller 104 is remote to each of the multiple networks, and can remotely communicate with network devices of any of the networks according to network protocols as described above.

Though example embodiments of the present disclosure can be implemented with a network controller 104 in communication with network devices of only one network, or with network devices of multiple networks concurrently, it should be understood that FIG. 1 illustrates multiple networks by way of example to illustrate that networks according to example embodiments (and network devices therein) can be heterogeneously configured for different computing services and/or different communication protocols, and the network controller 104 can interoperate with all such heterogeneous configurations of networks and network devices.

For example, the heterogeneous configurations of networks may include data centers and campuses. A data center can be configured to perform high-bandwidth data exchange between external devices, such as rack servers, load balancers, and the like, and can therefore be configured over primarily wired LAN connections. A campus can be configured to serve hosted computing services, applications, databases, and the like to end devices, over a range of possible bandwidths.

Furthermore, in each of the multiple networks 102A, 102B, 102C, and 102D, network devices can include any variety of electronic network devices having specifications generally as described subsequently, such as routers, switches, firewalls, and the like. Underlying hardware configurations of network devices can include commodity hardware, custom hardware, and any other combination thereof. It should be understood that, according to example embodiments of the present disclosure, network devices can be subsequently described using terminology applicable to devices running operating systems based on the Linux kernel, though embodiments of the present disclosure can be implemented on network devices running any suitable network operating system ("NOS").

According to example embodiments of the present disclosure, different examples of an NOS can be characterized by how each respective NOS configures a network device to create child processes from a running parent process. For example, an NOS based on the Linux kernel, as well as an NOS based on the Unix operating system in general, can configure a network device to create a child process by duplicating a parent process, including state of the parent process: the child process therefore configures the network device to run the same computer-executable instructions as the parent process, and, upon its creation, these instructions have executed to the same point as the parent process, while memory allocated to the child process contains the same variable values, parameters values, and the like as the parent process. This may be referred to as a fork system call, as shall be described subsequently.

In contrast, an NOS not based on the Linux kernel or based on the Unix operating system can configure a network device to create a new process without duplicating a parent process, and cannot create the child process by duplicating a parent process. It should be understood that, in the context of operating systems not based on the Linux kernel and not based on the Unix operating system, a new process created without duplicating a parent process may also be called a "child process" despite its non-inheritance of any parent process state. For avoidance of doubt, for the purpose of understanding the present disclosure, a "child process" herein shall be understood as being a duplicate of a parent process, and not as merely a newly initialized process which does not duplicate any state of a parent process. However, as shall further be elaborated upon subsequently, a "child process" according to the present disclosure should not be understood as being limited to those processes created by duplicating a parent process, but can also be understood as including those processes initialized as a new process and subsequently duplicating a parent process.

Furthermore, it should be understood that, according to example embodiments of the present disclosure, a NOS running on network devices configures the network devices to communicate with other devices and systems over a network according to a network management protocol. A network administrator can operate devices or systems, such as a network controller 104, which are external to a network, to remotely configure network devices of the network and remotely command network devices of the network.

For example, a network management protocol can be the Network Configuration Protocol ("NETCONF"), as published by the Internet Engineering Task Force ("IETF") in RFC 4741 and RFC 6241. A network management protocol configures network devices of the network to parse configurations in a standardized format. For example, configurations according to a network management protocol can be formatted in Extensible Markup Language ("XML"), or any other suitable text markup language operative to format configuration files.

Moreover, a NOS running on network devices further configures the network devices to perform remote procedure calls ("RPCs") which can be forwarded according to the network management protocol. By an RPC protocol, a network administrator can operate devices or systems outside a network, such as a network controller 104, to remotely configure network devices to run computer-executable instructions without physically accessing the network devices. Furthermore, by some RPC protocols, a network administrator can operate devices or systems outside a network, such as a network controller 104, to remotely cause network devices to collect telemetry data and to publish telemetry data on one or more networks, by output interfaces such as streaming interface. Google Remote Procedure Call ("gRPC") is an example of an RPC protocol by which an NOS can configure network devices to be remotely configured; to execute remote commands; and to collect and publish telemetry data in response to remote commands.

FIG. 1 further illustrates a domain controller 108, which can be one of the computing hosts of a network, which can furthermore be configured as part of a network domain encompassing computing hosts of the network. A network administrator can configure a domain controller 108 to handle authentication requests from end devices by an authentication protocol, so that users who successfully authenticate over their end devices can connect to the network domain. Thus, FIG. 1 illustrates an authenticated network connection from the network controller 104 to the domain controller 108, and then from the domain controller 108 to a network device 106 of a network 102A, the network device 106 having a failure injection module 110 (as shall be described subsequently).

Furthermore, by some RPC protocols, a network administrator can operate a network controller 104 to transmit an authentication request to any network device, so that, upon obtaining authentication, the network controller 104 can establish a network connection to any network device directly without connecting to a domain controller. FIG. 1 further illustrates several authenticated network connections from the network controller 104 to respective network devices 106 (without interconnecting through a domain controller) of networks 102B, 102C, and 102D, each network device 106 having a failure injection module 110 (as shall be described subsequently).

According to example embodiments of the present disclosure, network administrators can operate a network controller 104 to, in accordance with a network management protocol and/or an RPC protocol, establish one or more network connections to one or more network devices, and forward operation, administration, and maintenance ("OAM") packets over the one or more network connections to the one or more network devices.

Network administrators generally understand that OAM refers to a collection of protocols practiced in administrating and maintaining networks such as those described herein. Network administrators can configure network devices of a network to run OAM services (not illustrated herein) across a transport layer of the network; for the purpose of understanding example embodiments of the present disclosure, it should be appreciated that a running OAM service can configure a network device to parse OAM packets, a data packet format carrying telemetry data describing network performance, allowing network administrators to monitor and trace network traffic, thus discerning abnormal packet forwarding, packet loss, and the like. In accordance with in-situ OAM ("iOAM") proposals, OAM services can configure network devices to encapsulate packets according to various packet header protocols, such as IPv6, SRv6, VXLAN, and the like. It should be appreciated that network devices and network controllers can be configured to arbitrarily encapsulate and decapsulate packets with headers having OAM telemetry data embedded therein, according to OAM techniques.

Moreover, OAM protocols are developed to monitor and trace network traffic across one or more networks end-to-end; for example, with reference to the one or networks illustrated in FIG. 1, end-to-end packet traffic may travel from end devices through ingress interfaces into campus networks, through data center networks, and then through egress interfaces to other end devices. For these reasons, OAM services configure network devices to transmit packets across at least multiple networks, such as between a campus network, a private data center network, and a public cloud network, as well as outside the network through ingress and egress interfaces. Consequently, network administrators seeking to operate example embodiments of the present disclosure can rely upon OAM services already running on network devices 106 to propagate remotely transmitted configurations and commands through one or more networks, end-to-end.

Building on this infrastructure of OAM services, according to example embodiments of the present disclosure, network administrators further configure network devices 106 to run a failure injection module 110. The failure injection module 110 can configure a network device 106 to receive a packet encapsulated with an iOAM header (subsequently referred to as an "iOAM packet," for brevity), parse data embedded in an iOAM packet header. For the purpose of describing the failure injection module 110, subsequently, an example embodiment of a network device is described.

According to example embodiments of the present disclosure, network devices can include routers, switches, firewalls, and the like. A network device can receive packets forwarded over one or more network links from a host internal to or external to the one or more networks; determine a next hop, route, and/or destination to forward the packets to; and forward the packets to a host internal to or external to the one or more networks, determined by the next hop, route, and/or destination. A network device may be configured to determine a next hop, route, and/or destination by any combination of static routing tables and various dynamic routing algorithms.

A network device can be a physical electronic device having one or more processing units configured to execute computer-executable instructions, which may be implemented by, for example, one or more application specific integrated circuits ("ASICs"). The processing units may be configured by one or more non-transitory computer-readable media storing computer-executable instructions that, when executed by the processing units cause the processing units to perform the steps. For example, the computer-executable instructions may be encoded in integrated circuits of one or more ASICs, stored on memory of one or more ASICs, and the like. Furthermore, processing units can be implemented by one or more central processing units ("CPUs"), each including one or more cores.

A network device 106 may include computer-readable media, including volatile storage such as memory, and non-volatile memory such as disk storage, that stores an operating system. The operating system may generally support processing functions of the processing unit, such as computing packet routing according to one or more routing algorithms, modifying forwarding tables, distributing packets to network interfaces, and so forth.

A network device can be configured to run computer-executable instructions stored in one or more software images flashed onto computer-readable media of the network device, such as a Basic Input/Output System ("BIOS"), an NOS, and firmware. Software images as described herein may be characterized logically as one or more modules which configure one or more processing units of the network device to perform one or more related operations. For example, a failure injection module 110 can constitute computer-readable media of the network device having a software image flashed thereon, the failure injection module 110 thereby configuring the network device to perform specialized operations.

A network device 106 may include one or more network interfaces configured to provide communications between a respective processing unit and other network devices. The network interfaces may include devices configured to communicate with systems on PANs, wired and wireless LANs, wired and wireless WANs, and so forth. For example, the network interfaces may include devices compatible with Ethernet, Wi-Fi™, and so forth.

According to example embodiments of the present disclosure, a network device, include a router, a switch, a firewall, and the like, can be a computing system having one or more types of hardware modules installed permanently or exchangeably. These hardware modules can include additional processing units, such as ASICs, having computer-executable instructions embedded thereon, as well as computer-readable media having computer-executable instructions stored thereon. They can further include additional network interfaces. Thus, a failure injection module 110 can alternatively constitute a hardware module configured by its own processing unit and/or its own local computer-readable media to perform specialized operations in conjunction with a processing unit of the network device.

It should be understood that regardless of how a failure injection module 110 is embodied, a failure injection module 110 according to example embodiments of the present disclosure includes at least one or more sets of computer-executable instructions running in kernel space of a network device 106, such that the instructions may include calls to NOS-level system functions (subsequently "system calls," for brevity), such as a fork function as shall be described subsequently.

Figure 2:
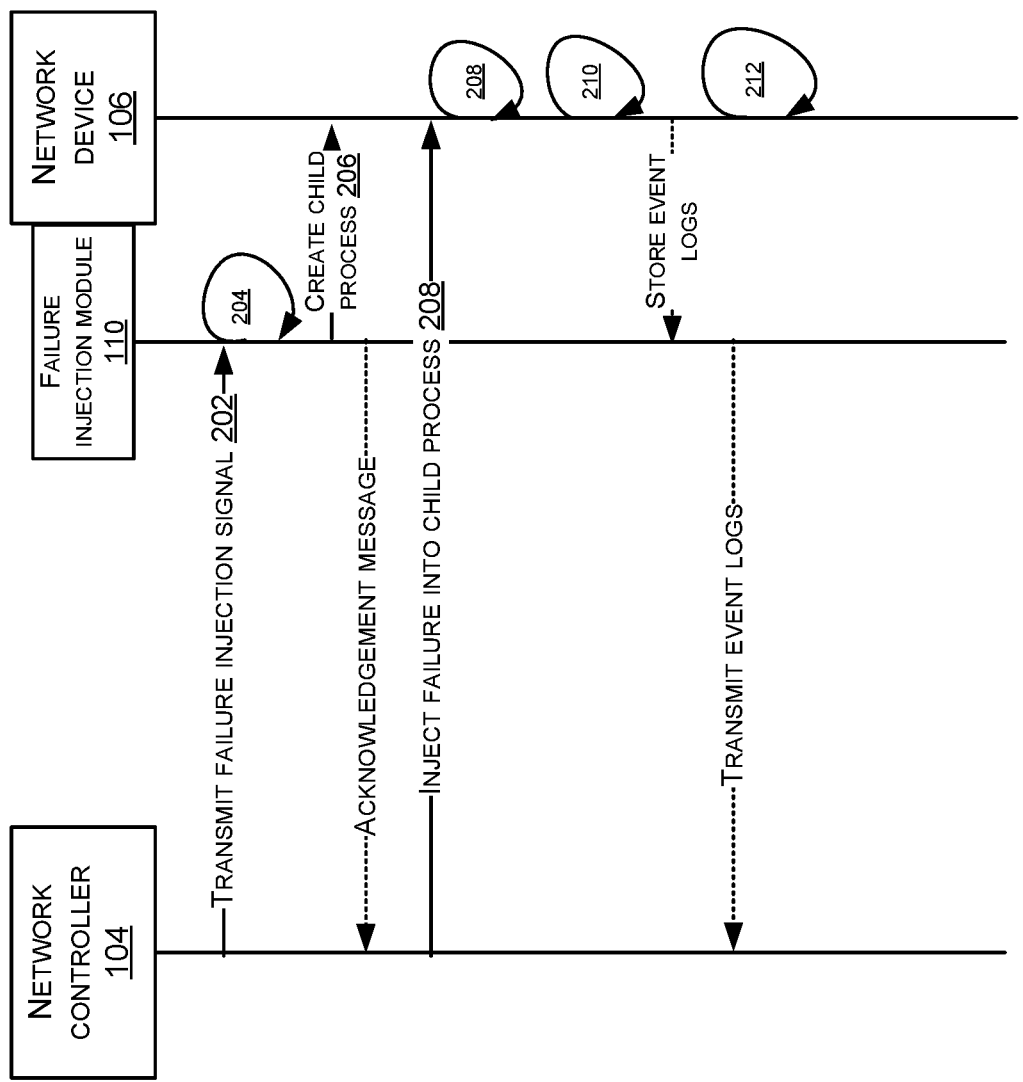
FIG. 2 illustrates a swim lane diagram of a remote failure injection communication protocol according to example embodiments of the present disclosure.

FIG. 2 illustrates a swim lane diagram of a remote failure injection communication protocol 200 according to example embodiments of the present disclosure. Steps of the remote failure injection communication protocol 200 are performed between a network controller 104 and a network device 106 of any network as illustrated above with reference to FIG. 1.

At a step 202, a network controller transmits a failure injection signal in a control plane packet over a network connection to a network device.

As described above, a network controller 104 can be configured to establish a network connection according to a network management protocol and/or an RPC protocol. Furthermore, the network controller 104 can be configured to establish a network connection according to a packet-based and/or datagram-based protocol such as Internet Protocol ("IP"), Transmission Control Protocol ("TCP"), User Datagram Protocol ("UDP"), other types of protocols, and/or combinations thereof.

Additionally, the network controller 104 can be configured to establish a network connection which transmits remote commands input at a network controller, according to a command-line interface ("CLI"), to a network device, such that the network device can execute these remotely input commands according to a network management protocol and/or an RPC protocol. A network controller 104 can be configured to encrypt the CLI commands and transmit the CLI commands over a secure channel by a cryptographic communication protocol such as Secure Shell ("SSH").

Additionally, to establish the network connection to the network device, the network controller 104 can be configured to transmit an authentication request to a domain controller as described above with reference to FIG. 1, so that the domain controller can authenticate the network controller 104 and allow the network controller 104 to establish the connection. Alternatively, to establish the network connection to the network device, the network controller 104 can be configured to transmit an authentication request to any network device 106 of one or more networks in accordance with an RPC protocol, so that the network device 106 can authenticate the network controller 106 without the need to communicate with a domain controller. By virtue of the connection being authenticated, the network controller 104 is allowed to transmit remote commands to the network device 106, and furthermore can be allowed to establish a secure network connection (such as a network connection encrypted end-to-end according to SSH) on the basis that commands transmitted from an authenticated network controller should not be malicious commands.

It should be understood that not all network devices are configured to establish a network connection by which a remote device, such as the network controller 104, can transmit a remote command to the network device. However, with respect to those network devices which are configured to establish such a network connection, the present disclosure will subsequently refer to the network connection as a "remote command session" for the duration that it remains open, for brevity.

According to example embodiments of the present disclosure, the network controller 104 can be configured to transmit a control plane packet having a failure injection signal embedded in-situ, and/or can be configured to transmit a control plane packet containing an out-of-band ("OOB") failure injection signal.

The network controller 104 can embed an in-situ failure injection signal according to various packet header protocols, such as IPv6, SRv6, VXLAN, and the like, in accordance with iOAM proposals to encapsulate any packet according to one of those proposals with an iOAM header. The network controller 104 can be configured to encode the failure injection signal using any header formatting which a network device 106 is configured to parse by a failure injection module. For example, a network controller 104 can be configured to embed, and a failure injection module can configure a network device 106 to parse, header data embedded as a flag encoded as one or more bits of a header. Alternatively and/or additionally, a network controller 104 can be configured to embed, and a failure injection module can configure a network device 106 to parse, header data embedded in a Type-Length-Value ("TLV") format. TLV may generally refer to any encoding format which encodes a value for a particular type of field, where the type of the field is encoded in a type field, the length of the value is encoded in a length field, and the value is encoded in a value field. However, it should be understood that the network device 106 can be configured to parse header data in any arbitrary format, as long as the data format encodes the following one or more failure types, as shall be described subsequently.

Alternatively and/or additionally, the network controller 104 can generate an OOB packet dedicated to encoding a failure injection signal. The network controller 104 can be configured to encode the failure injection signal using any suitable data formatting which a network device 106 is configured to parse by a failure injection module. For example, a network controller 104 can be configured to generate, and a failure injection module can configure a network device 106 to parse, OOB packet data encoded in the YANG data modeling language, as recognized according to network management protocols such as NETCONF. Alternatively and/or additionally, a network controller 104 can be configured to generate, and a failure injection module can configure a network device 106 to parse, OOB packet data encoded according to RPC protocols, such as gRPC and the like. However, it should be understood that the network device 106 can be configured to parse OOB packet data in any arbitrary format, as long as the data format encodes the following one or more failure types, as shall be described subsequently.

It should be further understood that header data or OOB packet data can further encode one or more failure parameters in addition to a failure injection signal, in any arbitrary format. These failure parameters can further configure a network device injecting a failure in step 208, as shall be described subsequently.

In either case, a network device 106 can recognize the transmitted packet as control plane traffic rather than data plane traffic (as shall be distinguished subsequently), and can therefore handle the control plane packet in accordance with FIGS. 3A and 3B as described subsequently.

At a step 204, the network device parses a failure type from the control plane packet.

According to example embodiments of the present disclosure, the network controller 104 can be configured to encode, and the network device 106 can be configured to parse, any of multiple failure types. The failure types can include at least the following, without limitation.

Failure types can further include a network interface shutdown, which can signal the network controller 104 remotely configuring the network device 106 to shut down one or more network interfaces that would be open during normal operation of the network device. Subsequently, the network administrator is interested in monitoring and tracing data packet traffic across one or more networks to determine consequences of the network interface shutdown.

Failure types can include an access control failure. By way of further elaboration, according to example embodiments of the present disclosure, "access controls" may refer to any implementation of LAN standards which allow access to some end devices outside an access-controlled network domain, and block access to other end devices outside the access-controlled network domain to a physical transmission medium of one or more networks of the access-controlled network domain. Allowance and blocking of access may reflect various authorization policies which describe endpoints which are authorized to access the access-controlled network domain and endpoints which are not authorized to access the access-controlled network domain.

Among network devices of one or more networks of the access-controlled network domain, some network devices may be configured as network access devices, such as a domain controller as described above. One or more authorization policies may configure network access devices to enforce various types of access control lists ("ACLs"), by identifying end devices as authorized to access the access-controlled network domain or not authorized to access the access-controlled network domain, according to whether endpoint IP addresses are present on an ACL or not.

Thus, an access control failure can include the network controller 104 remotely configuring the network device 106 to delete one or more ACL entries. Thus, the network device 106 should be a domain controller 108 or should be any other network access device of an access-controlled network domain, as described above. Subsequently, the network administrator is interested in monitoring and tracing data packet traffic across one or more networks to determine consequences of one or more end devices being excluded from accessing a network domain.

Failure types can further include a process failure, which can signal the network controller 104 remotely commanding the network device 106 to terminate one or more processes that a processing unit of the network device 106 would be running during normal operation of the network device. Subsequently, the network administrator is interested in monitoring and tracing data packet traffic across one or more networks to determine consequences of one or more running processes being terminated.

Failure types can further include a routing table failure, which can signal the network controller 104 remotely configuring the network device 106 to make one or more non-algorithmic modifications to a routing table stored at the network device 106. For example, the network device 106 can delete an entry of a routing table that indicates a next hop to a network destination, therefore non-algorithmically excluding a path from the routing table. Furthermore and/or alternatively, the network device 106 can insert a new entry of a routing table that indicates an arbitrary next hop to a network destination (where the network destination may or may not have another entry in the same routing table), therefore non-algorithmically creating a new path in the routing table. Furthermore and/or alternatively, the network device 106 can increase a cost metric recorded in an entry of a routing table, therefore non-algorithmically causing a path to be less likely to be selected over other paths.

Such non-algorithmic modifications can potentially confound the normal routing decision-making logic functions of a network device 106, causing inefficient paths to be selected and/or causing efficient paths to be excluded from selection. Subsequently, the network administrator is interested in monitoring and tracing data packet traffic across one or more networks to determine consequences of routing decisions being influenced by non-algorithmic modifications.

It should be understood that, conventionally, network devices 106 of one or more networks, including routers, switches, firewalls and the like, run computer-executable instructions configuring their respective processing units with decision-making logic which record, modify, and propagate routing table information; thus, conventionally, routing tables are algorithmically modified by this decision-making logic, including static routing tables and various dynamic routing algorithms. Instead, a routing table failure according to example embodiments of the present disclosure results in one or more network devices making arbitrary modifications to a routing table, not governed by conventional decision-making logic of network devices.

Failure types can further include a control plane failure, which can signal the network controller 104 remotely commanding the network device 106 to terminate one or more control plane processes that a processing unit of the network device 106 would be running during normal operation of the network device. Such control plane processes are described in further detail subsequently.

By way of further explanation, the architecture of one or more networks of FIG. 1 can be divided, logically, into at least a control plane and a data plane. The control plane includes collective functions of a network which determine decision-making logic of data routing in the network. For example, the control plane includes hardware functions of a network which record, modify, and propagate routing table information. These hardware functions may be distributed among any number of network devices of a network, including routers, switches, firewalls, and any other devices having decision-making logic.

The data plane includes collective functions of a network which perform data routing as determined by the above-mentioned decision-making logic. For example, the data plane includes hardware functions of a network which forward data packets. These hardware functions may be distributed among any number of network devices of a network, including routers, switches, and other devices having inbound and outbound network interfaces, and hardware running computer-executable instructions encoding packet forwarding logic.

Network devices of the data plane generally forward data packets according to next-hop forwarding. In next-hop forwarding, an ASIC of a network device, configured by computer-executable instructions, may evaluate, based on routing table information (which may be generated by control plane operations), a next-hop forwarding destination of a data packet received on an inbound network interface of a network device; and may forward the data packet over a network segment to the determined destination over an outbound network interface of the network device. It should be understood that individual network devices do not reside wholly within the control plane or data plane, though their routing decision-making operations can define the control plane and their packet forwarding actions can define the data plane.

Network administrators configure different processing units to perform control plane tasks and data plane tasks. For example, according to the CISCO IOS network operating system implemented by CISCO SYSTEMS INC., routing decision-making tasks performed in a control plane are configured to be performed by general-purpose processor(s) of network devices (furthermore including a kernel-level daemon process governing the control plane processes, referred to as IOSd according to CISCO IOS), such as CPUs, and forwarding tasks performed in a data plane are configured to be performed by special-purpose processors, such as ASICs. In this fashion, special-purpose processors are configured to run computer-executable instructions representing dedicated tasks which may be limited in terms of size or length, and general-purpose processors are configured to run a variety of computer-executable instructions representing processes of varying size and higher in computational intensity.

Therefore, the network device 106 terminating one or more control plane processes can disable some or all decision-making logic in maintaining routing tables, causing routing information to become stale in due course. Subsequently, the network administrator is interested in monitoring and tracing data packet traffic across one or more networks to determine consequences of routing information falling out of date.

Failure types can further include a computing resource failure, which can signal the network controller 104 remotely commanding the network device 106 to configure a dedicated runtime environment to be low in computing resources, such as processor allocation or memory allocation. The network device 106 thus causes one or more processes in this dedicated runtime environment to experience computing resource constraints. Subsequently, the network administrator is interested in monitoring and tracing data packet traffic across one or more networks to determine consequences of one or more processes being resource-starved. It should be understood that a dedicated runtime environment may be a computing environment configured at a network device, to which the network device can further allocate a limited subset of its native computing resources, such as limiting the dedicated runtime environment to one processor among multiple, and limiting the dedicated runtime environment to a subset of total available memory. As shall be subsequently described with reference to step 206, the network device can create a child environment by executing it in a dedicated runtime environment.

Failure types can further include an address resolution failure, which can signal the network controller 104 remotely commanding the network device 106 to delete one or more entries of an Address Resolution Protocol ("ARP") table. ARP processes implemented at a network device 106 configures the network device 106 to map IP addresses to Media Access Control ("MAC") addresses, and subsequently look up such mappings to resolve IP addresses to MAC addresses while resolving packet destinations. Deleting one or more entries of an ARP table can cause inefficient resolution, or failed resolution, of packet destinations. Subsequently, the network administrator is interested in monitoring and tracing data packet traffic across one or more networks to determine consequences of one or more ARP table entries being deleted.

Thus, at a step 204, the network device 106 can parse one or more failure types, including, but not being limited to, the above-mentioned failure types. Moreover, the network device 106 can determine one or more running processes impacted by the failure type. For example, one or more of the control plane processes as described above, such as those recording, modifying, and propagating routing table information, can be impacted by the failure type; the nature and identities of these particular processes is dependent upon the designs of various NOS running on network devices, and such details are beyond the scope of the present disclosure. Furthermore, one or more data plane operations can be impacted by the failure type, since changes in packet traffic are ultimately disposed of by some number of data plane operations. Furthermore, one or more operating system processes can be impacted by the failure type since changes in packet traffic can increase computing workload of a network device.

However, it should be understood that merely signaling the failure type does not cause a failure to be injected. Further operations as shall be described subsequently cause failure injection to be carried out at the network device 106.

At a step 206, the network device creates a child process by executing, in a dedicated runtime environment, a copy of one or more processes impacted by a parsed failure type.

According to example embodiments of the present disclosure, network administrators desire to inject a failure at one or more networks constituting a live production network environment during uptime of hosted services, applications, databases, and the like, so that the failures occur in native computing environments of network devices of the one or more networks. At the same time, network administrators do not desire to subject the availability and uptime of hosted computing services to the risk of being compromised by injected failures. Consequently, according to example embodiments of the present disclosure, a network device 106 is configured by computer-executable instructions running in kernel space to invoke a system call (as described above) provided by an NOS kernel. According to some example embodiments of the present disclosure, the system call configures a processing unit of the network device to run kernel-level operations that fork the one or more processes impacted by a failure type. According to other example embodiments of the present disclosure, the system call configures a processing unit of the network device to run kernel-level operations that initialize a new process while copying state from a parent process to the new process, resulting in the new process becoming a child process, as shall be further described subsequently.

By way of further explanation, it should be understood that operating systems based on the Linux kernel or the Unix operating system provide system calls that configure a processing unit of a computing system to, taking a parent process as input, output a second, child process which is a copy of the parent. Furthermore, the child process duplicates memory addresses of the parent process by a copy-on-write technique, wherein the contents of the parent process's memory addresses are not copied to the new addresses until the child process modifies the contents of its memory space. Such a system call is commonly referred to as a fork system call in the context of operating systems based on the Linux kernel or the Unix operating system. As most NOS are based on the Linux kernel, the majority of extant network devices are configured to run a fork system call.

Consequently, as a result of the parsed failure type, the network device 106 can determine one or more control plane processes impacted by the failure type, and can invoke a fork system call to create a child process duplicating the original parent control plane process, thus executing a copy of the parent control plane process impacted by the failure type.

It should be further understood that the network device can create a forked child process by executing it in a dedicated runtime environment as described above, the dedicated runtime environment being dedicated to running the forked child process. Furthermore, the forking process may operate according to copy-on-write, wherein memory allocated to the parent process is copied upon writes made to those memory addresses, rather than copied in its entirety, thereby conserving computing resources of the network device 106.

Figure 3A:
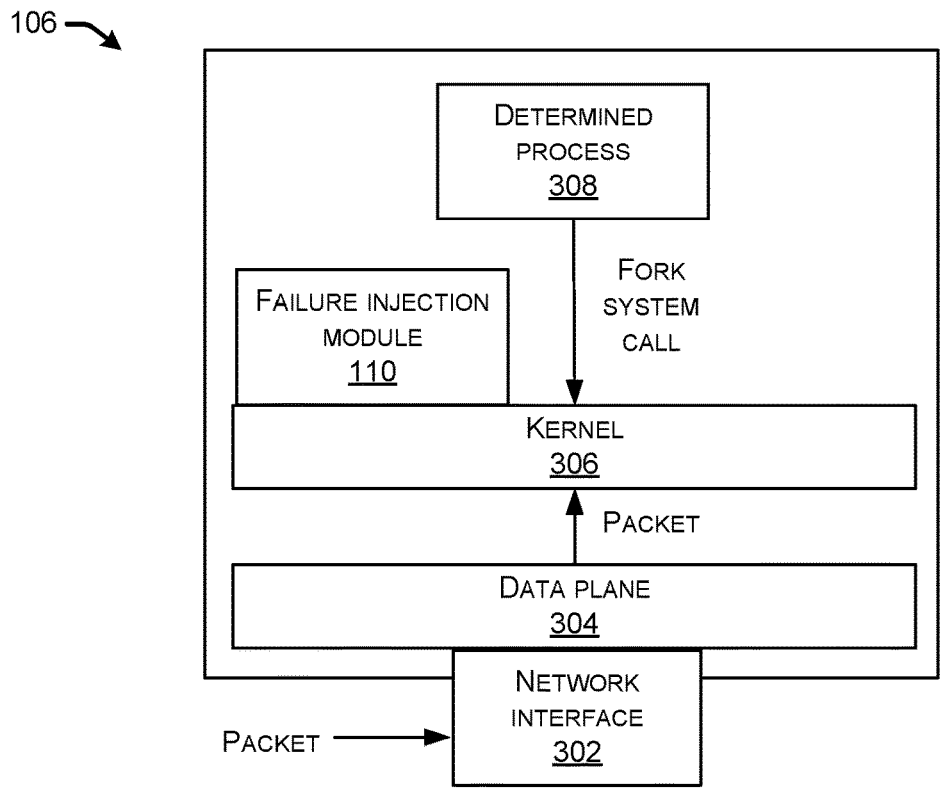
FIGS. 3A and 3B illustrate a network device running a fork system call taking a parent process as input.
Figure 3B:
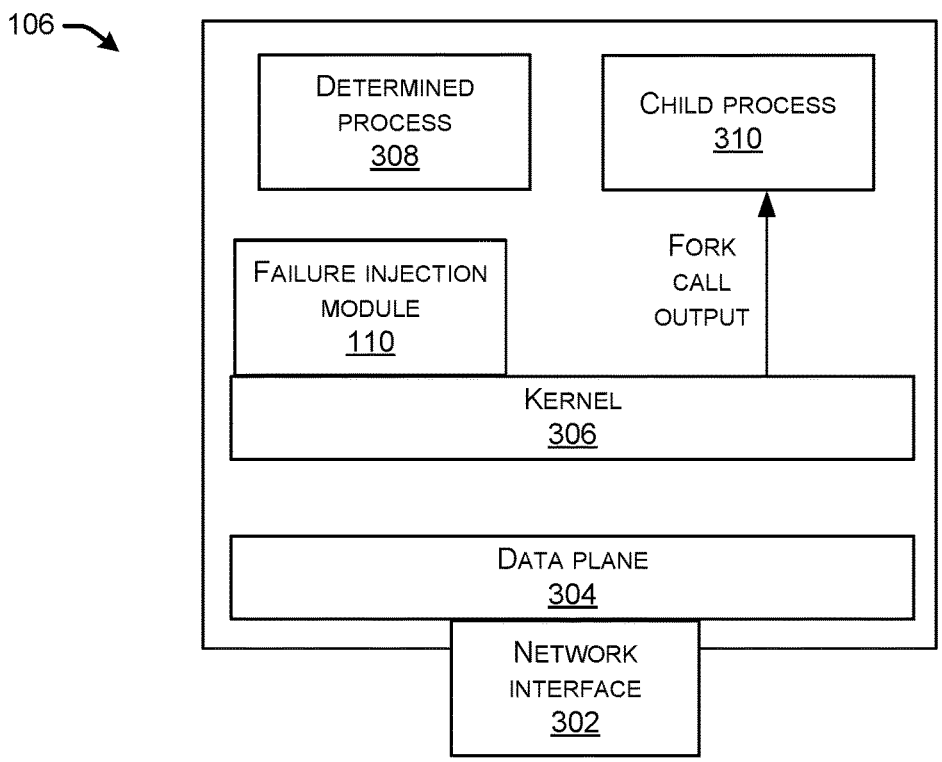

FIGS. 3A and 3B illustrate a network device running a fork system call taking a parent process as input. In FIG. 3A, a packet arriving at a network device 106 over a network interface 302 is first processed at a data plane 304 of the network device 106 (which, as described above, describes certain data packet forwarding functions of the network device). Upon the network device 106 determining that a received packet is control plane traffic rather than data plane traffic, a kernel 306 running on the network device 106 can intercept the received control plane packet and place the received packet in a punt path of the network device 106.

Various handler processes can configure the network device 106 to execute various functions in response to packets in the punt path. For example, a failure injection module 110 can configure the network device 106 to handle a control plane packet, as described above with reference to step 202 of FIG. 2, by parsing a failure type as described in step 204 to determine a running process impacted by the failure type; and by running a fork system call taking a determined process 308 as input, to create, in FIG. 3B, a child process 310 which is a copy of the determined process 308. By way of example, but without limitation thereto, the network device 106 can create a child process copying a kernel-level daemon process governing control plane processes, or a child process copying any other control plane process.

Furthermore, it should be understood that, according to kernel-level programming techniques, such as the Portable Operating System Interface ("POSIX") and any operating system compatible therewith, each process may include one or more running timers. Since any number of timers can be running in a process at any given time, according to example embodiments of the present disclosure, the network device can determine each timer running in a parent process (which can be found, for example, in a kernel-level file according to POSIX-compatible operating systems). The network device can create the child process with each timer therein stopped, keeping each timer stopped until later injecting a failure into the child process at a step 208. For example, according to POSIX-compatible operating systems, the network device can call a kernel-level function to stop each timer of the parent process before forking the parent process, while storing a last value of each timer prior to stopping; run a fork system call to fork the parent process and create a child process; call a kernel-level function to start each timer of the parent process at its respective last value; and, later, with reference to step 208, call a kernel-level function to start each timer of the child process at its respective last value (while or after injecting the failure into the child process).

In this fashion (as shall be elaborated upon with reference to step 208 subsequently), the network device can control timing of injecting a failure into the child process, thereby improving accuracy and usefulness of resulting telemetry data to network administrators.

However, example embodiments of the present disclosure can be implemented on network devices running an NOS not based on the Linux kernel and not based on the Unix operating system. On such network devices, a processing unit of the network device cannot run kernel-level operations that fork one or more processes. Instead, a processing unit of the network device runs kernel-level operations to initialize a new process. The new process is initialized such that it configures a processing unit to run the same computer-executable instructions running in a process impacted by the failure type. However, the new process will run these instructions from the beginning, rather than from the point to which the process impacted by the failure type has executed.

Therefore, at substantially the same time as the processing unit initializes the new process, the processing unit may freeze other processes running on the network device, such that the processing unit can copy a frozen state of one or more processes impacted by the failure type without those processes advancing past a point at which the new process was initialized, and without state of any process being impacted by another running process. In this fashion, the processing unit can then copy the frozen state of a process impacted by the failure type to the new process, including the states of any frozen timers; since the new process is running the same computer-executable instructions, memory addresses allocated to the process impacted by the failure type may substantially correspond, in content, to memory addresses allocated to the new process.

Thereafter, the process impacted by the failure type may subsequently be referred to as a "parent process" and the new process having a state of the parent process copied thereto may subsequently be referred to as a "child process." It should be understood that "creating" a child process, according to example embodiments of the present disclosure, includes copying state of the parent process into the child process, regardless of whether this comes after the child process was newly initialized.

A network device 106 according to example embodiments of the present disclosure is therefore provisioned with at least sufficient computing resources to run redundant copies of any or all control plane processes during normal operation of the network device, including processing units having at least sufficient processing power (including any number of processor cores), and volatile memory having at least sufficient storage space.

Alternatively and/or additionally, the network device 106 can determine one or more data plane operations and one or more operating system processes impacted by the failure type. In the event that the network device 106 creates a child process of a data plane operation, a special-purpose processor of the network device 106, such as an ASIC, may provide a redundant integrated circuit wherein the network device 106 executes duplicate computer-executable instructions encoded at the redundant integrated circuit. In the event that the network device 106 creates a child process of an operating system process, a processing unit of the network device 106 may create a snapshot of each process running in kernel space of the network device 106, then initialize a new virtual machine running each process of the kernel space of the network device 106, where the virtual machine loads the snapshot into memory, causing state of each kernel-space process to be copied.

According to example embodiments of the present disclosure, upon successfully creating the child process, the network device 106 can be configured to send an acknowledgement message to the network controller.

According to some example embodiments of the present disclosure, upon creating a child process, the network device 106 can be configured to receive CLI commands input at the network controller 104 over the remote command session established between the network controller 104 and the network device 106. The network controller may establish the remote command session in response to receiving the above-mentioned acknowledgement message. As described above, the network controller 104, after authentication, can be allowed to transmit remote commands to the network device 106, and furthermore can be allowed to establish a secure network connection (such as a network connection encrypted end-to-end according to SSH). In this context, it should be understood that the network controller 104 can, independently, run a user interface application which configures the network controller 104 to receive CLI commands input over an input interface, so that a network administrator can input CLI commands targeting remote command of the child process in a fashion which injects a failure into the child process, without targeting its parent process.

However, not all example embodiments of the present disclosure configure the network device 106 to receive remote CLI commands. Subsequently, with reference to step 208, example embodiments of the present disclosure are described to permit for whether the network device 106 is configured to receive remote CLI commands or not.

At a step 208, one of the network controller or the network device injects a failure into the child process.

As FIG. 2 illustrates, step 208 can either connect the network controller 104 and the network device 106, or connect the network device 106 to itself. This reflects the multiple possible embodiments of step 208, as shall be described subsequently in further detail.

The network device 106 can be configured with different mechanisms for injecting the respective failure into the child process, and one or more of these mechanisms can coexist in the same network device 106. For example, the network controller 104 is configured to transmit a remote command to the network device, the remote command configuring the network device to execute the remote command in a runtime environment of the child process. Furthermore, a kernel-level process running on the network device 106 is configured to forward an inter-process communication ("IPC") signal to the child process, the IPC signal triggering the network device 106 to execute a function in a runtime environment of the child process.

Thus, example embodiments of the present disclosure provide several mechanisms for injecting the respective failure into the child process: a network device opening a remote command session connected to the network controller, waiting for a remote command from the network controller over the remote command session, then running a received remote command in a runtime environment of a child process running on the network device, and a kernel-level process configuring a network device to IPC signal to a child process running on the network device, triggering a function being executed in a runtime environment of the child process, without waiting for a remote command from the network controller.

As mentioned above, some, but not all, network devices can be configured to open a remote command session connected to the network controller. For network devices not configured in this way, not all mechanisms for injecting the respective failure into the child process are necessarily available: IPC signaling may be available, while remote commands may be unavailable.

Furthermore, it should be understood that according to example embodiments of the present disclosure, a remote command session is not configured to allow the network device to run a received remote command in a runtime environment of any running process other than the child process, so as to prevent failures being injected into processes which may be critical to network uptime.

Therefore, any failure type as previously described can be injected by the network device 106, after completing the above step 206, opening a remote command session connected to the network controller 104 and waiting to receive a CLI command transmitted over the remote command session; then, upon receiving the CLI command, executing the CLI command in a runtime environment of the child process according to a network management protocol and/or an RPC protocol. Alternatively and/or additionally, any failure type as previously described can be injected by a kernel-level process configuring the network device 106 to, after completing the above step 206, IPC signaling to the child process, triggering the network device executing a function in a runtime environment of the child process.

Furthermore, it should be understood that the network device 106 further calls a kernel-level function to start each timer of the child process at its respective last value, as described above with reference to step 206.

For example, the network device can be configured to inject an interface shutdown failure by opening a remote command session; waiting to receive, over the remote command session, a CLI command which runs an interface shutdown function according to an NOS running on the network device; then, upon receiving the CLI command, executing it on a network interface in a runtime environment of the child process. Or, the network device can be configured to inject an interface shutdown failure by a kernel-level process configuring the network device to IPC signal the child process, triggering the network device executing an interface shutdown function on a network interface in a runtime environment of the child process. In either case, a failure parameter parsed during step 204 can further configure the network device to specify a particular network interface in calling the interface shutdown function. Alternatively, the network device can specify a random network interface in calling the interface shutdown function.

For example, the network device can be configured to inject an access control failure by opening a remote command session; waiting to receive, over the remote command session, a CLI command which runs an ACL deletion function according to a NOS running on a network device; then, upon receiving the CLI command, executing it on an ACL table written on computer-readable media of the network device, in a runtime environment of the child process. Or, the network device can be configured to inject an access control failure by a kernel-level process configuring the network device to IPC signal the child process, triggering the network device executing an ACL deletion function on an ACL table written on computer-readable media of the network device, in a runtime environment of the child process. In either case, a failure parameter parsed during step 204 can further configure the network device to specify some number of ACL entries to delete in calling the ACL deletion function. Alternatively, the network device can delete all ACL entries in calling the ACL deletion function. Thus, the network device should be a domain controller or should be any other network access device of an access-controlled network domain. Moreover, it should be understood that the network device can be configured to perform copy-on-write from memory addresses of the parent process for each ACL entry affected by the access control failure injection.

For example, the network device can be configured to inject a process failure by opening a remote command session; waiting to receive, over the remote command session, a CLI command which runs a process shutdown function according to a NOS running on a network device; then, upon receiving the CLI command, executing it in a runtime environment of the child process to terminate one or more processes that a processing unit of the network device would be running during normal operation of the network device. Or, the network device can be configured to inject a process failure by a kernel-level process configuring the network device to IPC signal the child process, triggering the network device executing a process shutdown function on a network interface in a runtime environment of the child process. In either case, a failure parameter parsed during step 204 can further configure the network device to specify a particular running process in calling the process shutdown function. Alternatively, the network device can specify a random running process in calling the process shutdown function.

For example, the network device can be configured to inject a routing table failure by opening a remote command session; waiting to receive, over the remote command session, a CLI command which runs a routing table deletion function, a routing table insertion function, and/or a routing table modification function according to a NOS running on a network device; then, upon receiving the CLI command, executing it on a routing table written on computer-readable media of the network device, in a runtime environment of the child process. Or, the network device can be configured to inject a routing table failure by a kernel-level process configuring the network device to IPC signal the child process, triggering the network device executing a routing table deletion function, a routing table insertion function, and/or a routing table modification function on a routing table written on computer-readable media of the network device, in a runtime environment of the child process. In either case, a failure parameter parsed during step 204 can further configure the network device to specify some number of ACL entries to delete, insert, and/or modify in calling the routing table deletion function, the routing table insertion function, and/or the routing table modification function, and can configure the network device to insert or modify routing table entries with particular values. Alternatively, the network device can delete all routing table entries in calling the routing table deletion function, and/or can insert routing table entries or modify routing table entries with random values in calling the routing table insertion function or the routing table modification function. Moreover, it should be understood that the network device can be configured to perform copy-on-write from memory addresses of the parent process for each routing table entry affected by the routing table failure injection.

For example, the network device can be configured to inject a control plane failure by opening a remote command session; waiting to receive, over the remote command session, a CLI command which runs a control plane process shutdown function according to a NOS running on a network device; then, upon receiving the CLI command, executing it in a runtime environment of the child process to terminate one or more control plane processes that a processing unit of the network device would be running during normal operation of the network device. Or, the network device can be configured to inject a control plane process failure by a kernel-level process configuring the network device to IPC signal the child process, triggering the network device executing a control plane process shutdown function on a network interface in a runtime environment of the child process. While the network device can be configured to run different suites of control plane processes during normal operation of the network device, regardless of the particular control plane configuration of the network device, the network device can be configured to specify all running control plane processes in calling the control plane process shutdown function.

Failure types can further include a computing resource failure, which can signal the network controller 104 remotely commanding the network device 106 to configure a dedicated runtime environment to be low in computing resources, such as processor allocation or memory allocation. The network device 106 thus causes one or more processes in this dedicated runtime environment to experience computing resource constraints. Subsequently, the network administrator is interested in monitoring and tracing data packet traffic across one or more networks to determine consequences of one or more processes being resource-starved.

For example, the network device can be configured to inject a computing resource failure by opening a remote command session; waiting to receive, over the remote command session, a CLI command which runs runtime environment configuration according to a NOS running on a network device; then, upon receiving the CLI command, performing it on a runtime environment of the child process to configure the runtime environment to be low in computing resources, such as processor allocation, or memory allocation. Or, the network device can be configured to inject a computing resource failure by a kernel-level process configuring the network device to IPC signal the child process, triggering the network device performing runtime environment configuration on a runtime environment of the child process. In either case, a failure parameter parsed during step 204 can further configure the network device to configure the network device to configure the runtime environment with particular processor and/or memory allocation levels. Alternatively, the network device can be configured to reduce processor and/or memory allocation by some fixed proportion.

For example, the network device can be configured to inject an address resolution failure by opening a remote command session; waiting to receive, over the remote command session, a CLI command which runs an ARP table deletion function according to a NOS running on a network device; then, upon receiving the CLI command, executing it on an ARP table written on computer-readable media of the network device, in a runtime environment of the child process. Or, the network device can be configured to inject a routing table failure by a kernel-level process configuring the network device to IPC signal the child process, triggering the network device executing an ARP table deletion function on an ARP table written on computer-readable media of the network device, in a runtime environment of the child process. In either case, a failure parameter parsed during step 204 can further configure the network device to specify some number of ARP table entries to delete in calling the ARP table deletion function. Alternatively, the network device can delete all ARP table entries in calling the ARP table deletion function.

Figure 4:
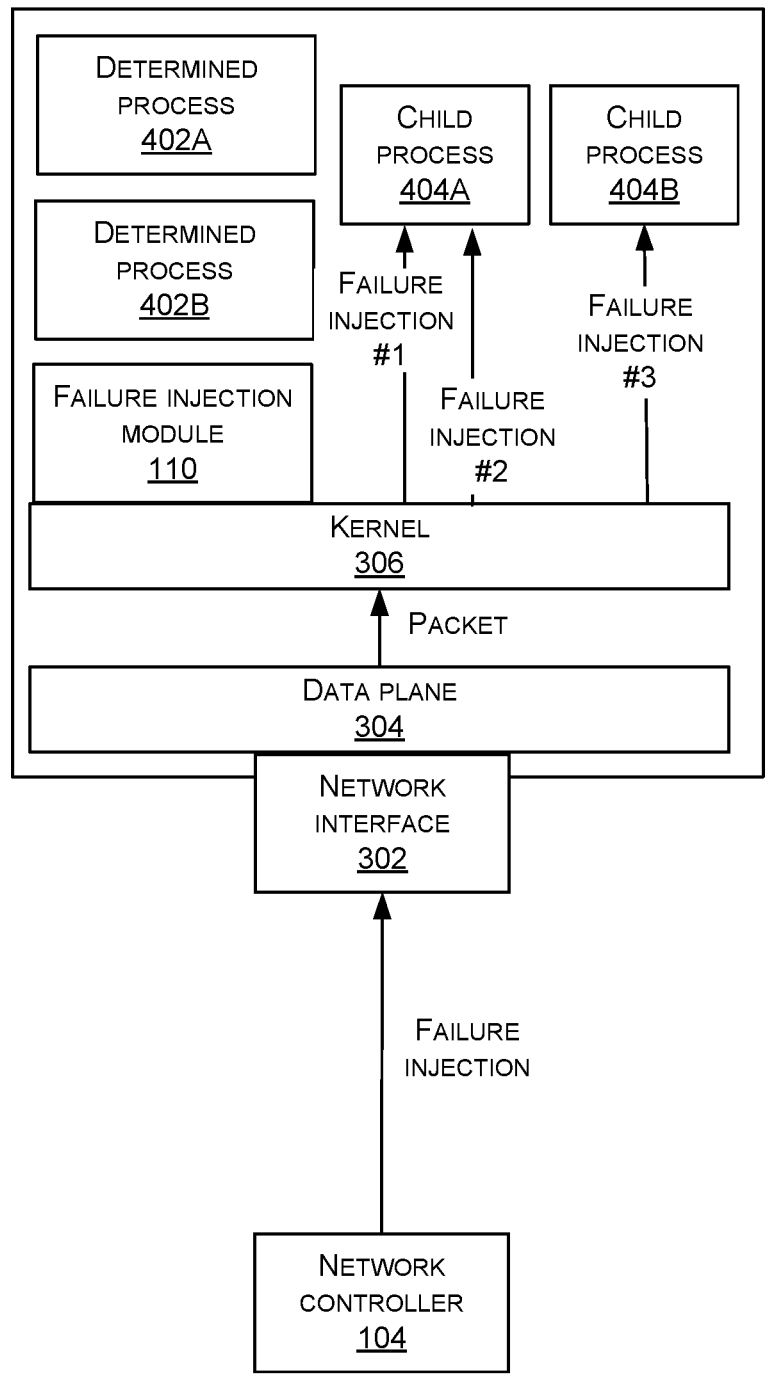
FIG. 4 illustrates a network device creating multiple child processes and one of a network controller or the network device injects at least one failure into each child process.

Furthermore, it should be understood that a same network device can be configured to perform steps 206 and 208 each more than once, each performance being independent or concurrent to each other. FIG. 4 illustrates a network device creating multiple child processes and one of the network controller or the network device (the network controller, as illustrated herein) injects at least one failure into each child process. In each instance, a failure injection module 110 configures the network device 106 to handle a control plane packet, as described above with reference to step 202 of FIG. 2, by parsing a failure type as described in step 204 to determine a running process impacted by the failure type; and by running a fork system call or a new process initializing system call taking a determined process 402A and 402B as input, to create respective child processes 404A and 404B which are respective copies of the determined processes 402A and 402B. The network device 106 can be configured to inject one, or more than one, failure into each child process (herein, two failures are injected into 404A and one failure is injected into 404B). The determined processes 402A and 402B can be the same, or can be different.

At a step 210, the network device traces events at the child process running on the network device.

It should be understood that after failure injection at step 208, the child process running on the network device can exhibit various abnormal or erroneous behavior, whether in due course or in response to one or more fault tests being performed upon the network device.

For example, according to the discipline of fault testing, network administrators can define a variety of soft failure tests configured to verify that the behavior of processes running on a network device is in accordance with intended configured behavior of the network as a whole. Each soft failure test may define inputs into one or more sections of a target running process to be tested; possible outputs from the target process; and conditions (i.e., corresponding sets of inputs and/or outputs) which define success and/or failure of the soft failure test.

Figure 5:
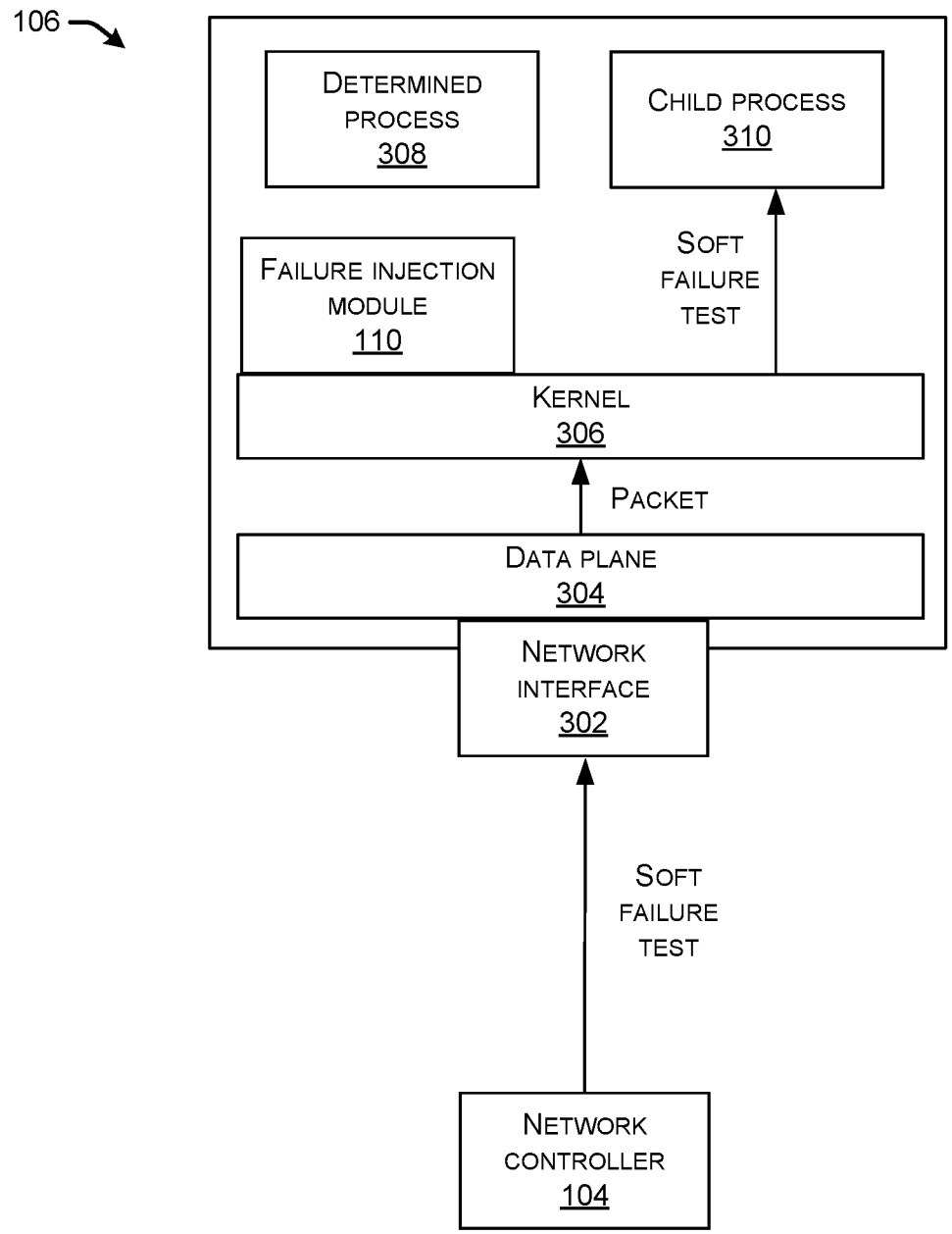
FIG. 5 illustrates a network controller performing a soft failure test on a network device.

FIG. 5 illustrates a network controller performing a soft failure test on a network device. The network controller 104 can send a soft failure test in a control plane packet to the network device 106, where the failure injection module 110 can process the control plane packet and configure the network device 106 to execute the soft failure test.

Regardless of whether the network device 106 executes a soft failure test or merely waits for abnormal or erroneous behavior to emerge in due course, the network device 106 can trace events at the child process and record the traced events as telemetry data. According to example embodiments of the present disclosure, the network device can execute any suitable system call provided by an NOS running on the network device 106 to monitor and trace events occurring at any number of running processes on the network device 106. The network device can record these events on one or more post-injection event logs written to memory and/or to computer-readable media.

The network device 106 can store the one or more post-injection event logs locally on computer-readable media, where a network administrator can retrieve the event logs, or the network device 106 can transmit the one or more post-injection event logs to the network controller 104 over a network connection established between the network controller 104 and the network device 106.

At a step 212, the network device terminates the child process.

The network device 106 can terminate the child process at any time after writing at least some traced events at the child process to a log.

By the implementation of the above techniques, example embodiments of the present disclosure provide a network administrator with telemetry data, in the form of one or more such logs of traced events, which enables the network administrator to make one or more determinations of interest as described above with reference to step 208. For example, a network administrator can design one or more failure injections to introduce particular network configuration parameters, such as particular computing resource constraints, particular routes and costs associated therewith, and the like. The network administrator can inject such parameters into a production network environment as failures, and then verify, through review of logs of traced events, the network states that are inducted by such configuration parameters in a network environment as close to the production network environment as possible.

Furthermore, techniques according to example embodiments of the present disclosure can be extended to induce any arbitrary network configuration in live network environments, not just failures. For example, in high-availability network clusters, in which network environments include both active hosts and standby hosts, network administrators can implement techniques according to example embodiments of the present disclosure to run processes on a standby host in an active configuration without placing the standby host into active status, therefore providing an added level of testing for the live network environment.

Depending on the outcomes of such failure injections and soft failure tests, the network administrator can experiment with different network configurations before selecting configurations to be applied to the production network environment, in order to induce the network to function in a desired state, without jeopardizing availability and uptime of hosted computing services on the network, and without jeopardizing the level of service and availability received by end users.

Figure 6:
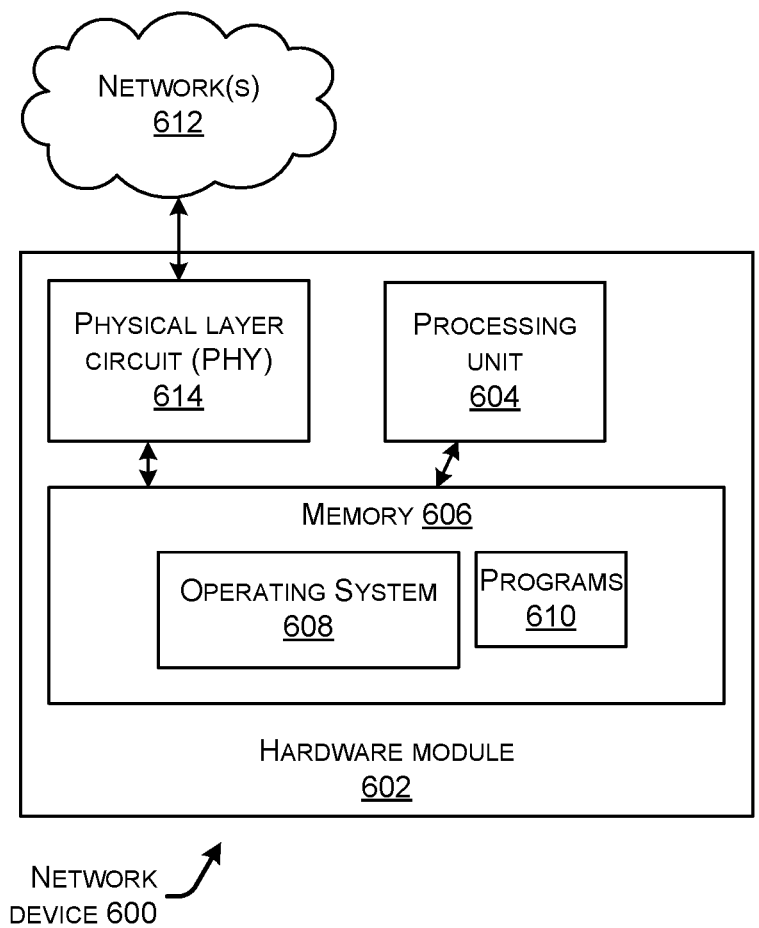
FIG. 6 shows an example architecture for a network device capable of being configured to implement the functionality described herein.

FIG. 6 shows an example architecture for a network device 600 capable of being configured to implement the functionality described above. The architecture shown in FIG. 6 illustrates a computing device assembled from modular components, and can be utilized to execute any of the software components presented herein.

The network device 600 may include one or more hardware modules 602, which may be a physical card or module to which a multitude of components or devices can be connected by way of a system bus or other electrical communication paths. Such a physical card or module may be housed in a standalone network device chassis, or may be installed in a rack-style chassis alongside any number of other physical cards or modules. In one illustrative configuration, one or more processing units 604 may be standard programmable processors or programmable ASICs that perform arithmetic and logical operations necessary for the operation of the hardware module 602.

The processing units 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

Integrated circuits may provide interfaces between the processing units 604 and the remainder of the components and devices on the hardware module 602. The integrated circuits may provide an interface to memory 606 of the hardware module 602, which may be implemented as on-chip memory such as TCAM, for storing basic routines configuring startup of the hardware module 602 as well as storing other software components necessary for the operation of the hardware module 602 in accordance with the configurations described herein. The software components may include an operating system 608, programs 610, and data, which have been described in greater detail herein.

The hardware module 602 may establish network connectivity in a network 612 by forwarding packets over logical connections between remote computing devices and computer systems. The integrated circuits may provide an interface to a physical layer circuit (PHY) 614 of the hardware module 602, which may provide Ethernet ports which enable the hardware module 602 to function as an Ethernet network adapter.

The hardware module 602 can store data on the memory 606 by transforming the physical state of the physical memory to reflect the information being stored. The specific transformation of physical state can depend on various factors, in different embodiments of this description. Examples of such factors can include, but are not limited to, the technology used to implement the memory 606, whether the memory 606 is characterized as primary or secondary storage, and the like.

For example, the hardware module 602 can store information to the memory 606 by issuing instructions through integrated circuits to alter the electrical characteristics of a particular capacitor, transistor, or other discrete component in a solid-state storage unit. Other transformations of physical media are possible without departing from the scope and spirit of the present description, with the foregoing examples provided only to facilitate this description. The hardware module 602 can further read information from the memory 606 by detecting the physical states or characteristics of one or more particular locations within the memory 606.

The memory 606 described above may constitute computer-readable storage media, which may be any available media that provides for the non-transitory storage of data and that can be accessed by the hardware module 602. In some examples, the operations performed by the network device 600, and/or any components included therein, may be supported by one or more devices similar to the hardware module 602. Stated otherwise, some or all of the operations performed by the network device 600, and/or any components included therein, may be performed by one or more hardware modules 602 operating in a networked, distributed or aggregated arrangement over one or more logical fabric planes over one or more networks.

By way of example, and not limitation, computer-readable storage media can include volatile and non-volatile, removable and non-removable media implemented in any method or technology. Computer-readable storage media includes, but is not limited to, TCAM, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the memory 606 can store an operating system 608 utilized to control the operation of the hardware module 602. According to one embodiment, the operating system comprises the CISCO IOS operating system from CISCO SYSTEMS INC. of San Jose, Calif. It should be appreciated that other operating systems can also be utilized. The memory 606 can store other system or application programs and data utilized by the hardware module 602.

In one embodiment, the memory 606 or other computer-readable storage media is encoded with computer-executable instructions which transform any processing units 604 from a general-purpose computing system into a special-purpose computer capable of implementing the embodiments described herein. These computer-executable instructions specify how the processing units 604 transition between states, as described above. According to one embodiment, the hardware module 602 has access to computer-readable storage media storing computer-executable instructions which, when executed by the hardware module 602, perform the various processes described above with regard to FIGS. 1-5. The hardware module 602 can also include computer-readable storage media having instructions stored thereupon for performing any of the other computer-implemented operations described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A network device comprising:
   one or more processing units; and
   one or more non-transitory computer-readable media storing computer-executable instructions that, when executed by the one or more processing units, cause the one or more processing units to:
   receive a control plane packet transmitted over a network connection;
   parse a parsed failure type from the control plane packet;
   create a child process by executing, in a dedicated runtime environment, a copy of a parent control plane process impacted by the parsed failure type, wherein the copy is created by performing a fork system call on the parent control plane process, and wherein the dedicated runtime environment is dedicated to the child process;
   stop each timer of the parent process before performing the fork system call; and
   start each timer of the child process at its respective last value after performing the fork system call.

2. The network device of claim 1, wherein the network connection is established according to at least one of a network management protocol and a remote procedure call (RPC) protocol.

3. The network device of claim 1, wherein the parsed failure type is embedded in-situ in the control plane packet.

4. The network device of claim 1, wherein the instructions further cause the one or more processing units to receive, over a remote command session, a command-line interface (CLI) command, and to execute the CLI command in the runtime environment of the child process.

5. The network device of claim 1, wherein the instructions further cause the one or more processing units to inter-process communication (IPC) signal to the child process, triggering a function being executed in the runtime environment of the child process.

6. A method comprising:
   receiving a control plane packet transmitted over a network connection;
   parsing a parsed failure type from the control plane packet;
   creating a child process by executing, in a dedicated runtime environment, a copy of one or more parent control plane processes impacted by the parsed failure type, wherein the copy is created by performing a fork system call on the parent control plane process, and wherein each time the dedicated runtime environment is dedicated to the child process;
   stopping each timer of the parent process before performing the fork system call; and
   starting each timer of the child process at its respective last value after performing the fork system call.

7. The method of claim 6, wherein the network connection is established according to at least one of a network management protocol and a remote procedure call (RPC) protocol.

8. The method of claim 6, wherein the parsed failure type is embedded in-situ in the control plane packet.

9. The method of claim 6, further comprising receiving, over a remote command session, a command-line interface (CLI) command, and executing the CLI command in the runtime environment of the child process.

10. The method of claim 6, further comprising inter-process communication (IPC) signaling the child process, triggering a function being executed in the runtime environment of the child process.

* * * * *